(No Model.) 2 Sheets—Sheet 1.

H. PARK.
SPRING SEAT SUPPORT.

No. 551,293. Patented Dec. 10, 1895.

WITNESSES
C. C. Burdine.
C. B. Bull.

Horace Park
INVENTOR
by Dodge & Son,
Attorneys.

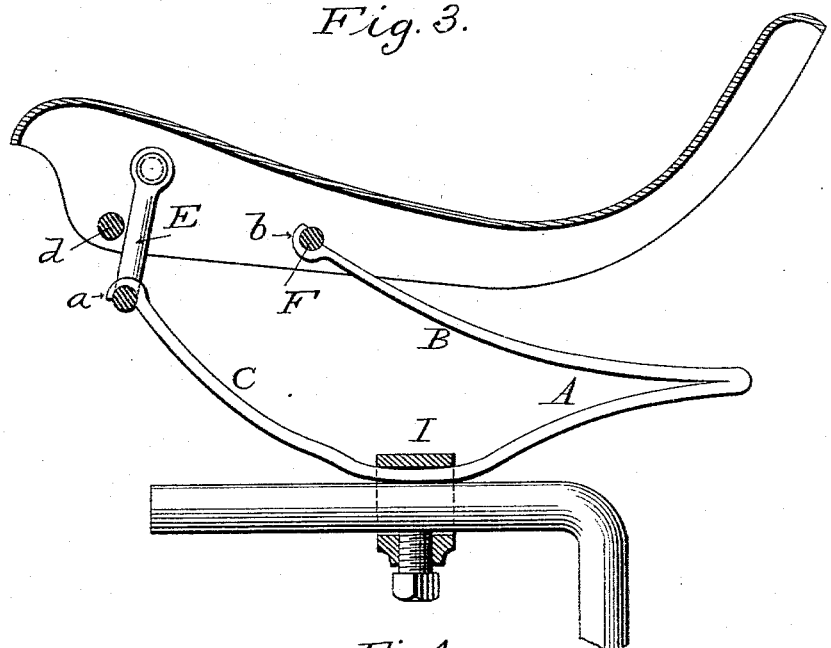
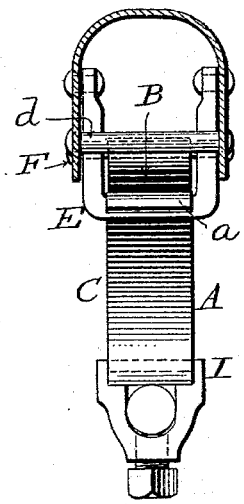

UNITED STATES PATENT OFFICE.

HORACE PARK, OF COLUMBUS, OHIO.

SPRING SEAT-SUPPORT.

SPECIFICATION forming part of Letters Patent No. 551,293, dated December 10, 1895.

Application filed February 4, 1895. Serial No. 537,260. (No model.)

*To all whom it may concern:*

Be it known that I, HORACE PARK, a citizen of the United States, residing at Columbus, in the county of Franklin and State of Ohio, have invented certain new and useful Improvements in Spring Seat-Supports, of which the following is a specification.

My invention relates to spring seat-supports, and is designed more particularly for use in connection with bicycles and like vehicles, but obviously capable of use in connection with other seats.

When racing on bicycles, it is the custom to dispense with a spring-support for the seat in order that there may be no variation in the relative positions of the seat and pedal-shaft; but in ordinary riding where the road is not always smooth and even it is very desirable to support the seat upon a spring which will take up the jar and vibration as the wheels pass over the uneven road-surface.

The object of the present invention is to so construct the spring seat-support that it may be used either for racing purposes or for ordinary road-riding without any change or adjustment except the change in the position assumed by the rider himself in the seat or saddle. When racing, the rider leans forward, and by throwing his weight upon the horn or nose of the saddle will obtain no spring or yielding action from the seat-support; but when he sits upright in the seat or saddle his weight is shifted into such position as to bring into action the yielding or spring properties of the support.

Figure 1:
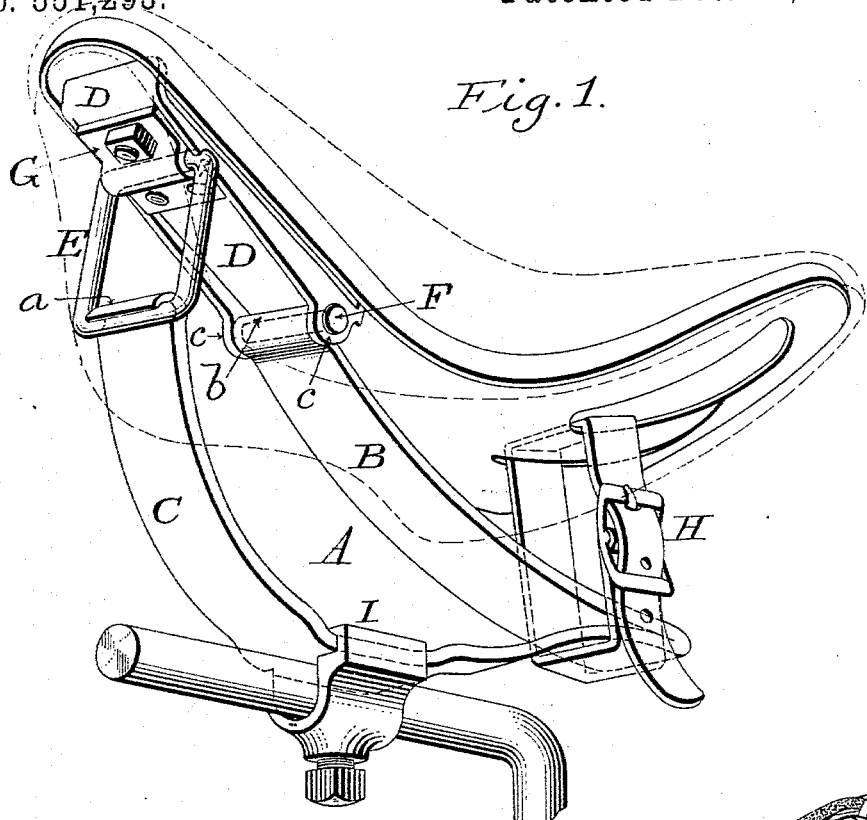
Figure 2:
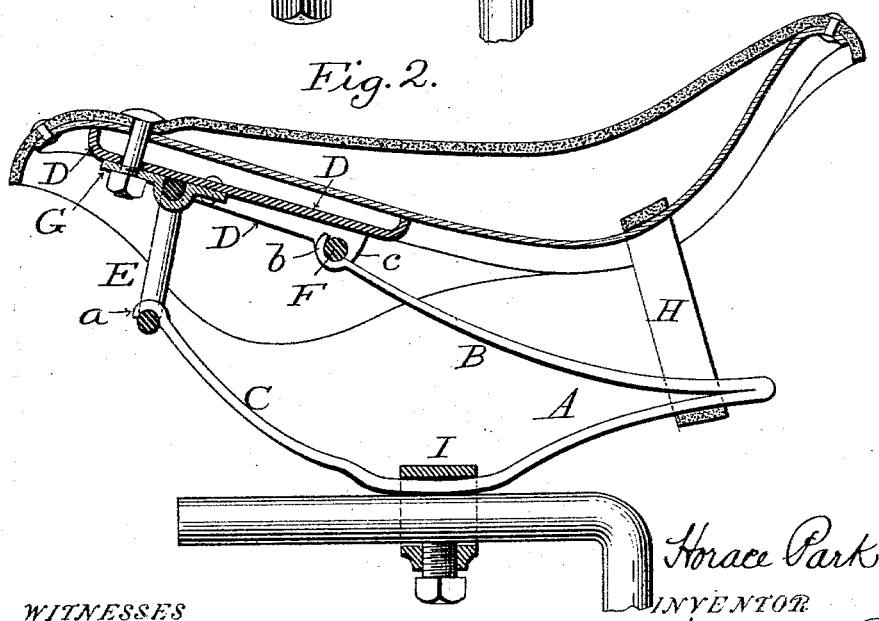

In the drawings, which show my support applied to a bicycle saddle or seat, Figure 1 is a perspective view looking upward or from below. Fig. 2 is a side elevation with parts in section, and Figs. 3 and 4 views illustrating a modification.

A indicates the spring proper comprising two arms or leaves B and C, connected at the rear and diverging at their front ends, the upper leaf B extending upward above the lower leaf but terminating in rear thereof. In practice, the spring will be made of one piece folded or bent upon itself, as shown; but it may obviously be made of two pieces riveted or otherwise fastened together.

D indicates a plate which carries at its forward end a stirrup, bail, or link E, and at its rear end a pin or bolt F, the former to receive the end of leaf C, which is fashioned into a hook $a$ to fit the lower bar of the link, while the latter (bolt F) receives the hooked or curved end $b$ of the leaf B. Link E may be pivotally attached to the plate in various ways; but a simple and strong means for securing the link in place is shown in the drawings and comprises merely a short plate G bolted or riveted to the under side of plate D and provided with a transverse groove or seat to receive the upper bar of the link. Pin or bolt F will advisably be carried in ears $c$ formed on the plate D, and will have its ends riveted or upset to prevent it from working out.

The plate D is employed to connect the spring to the frame of the seat or saddle, and will be varied as required to adapt the present invention to saddles or seats of different styles, or will be omitted where the spring can be conveniently attached directly to said saddle-frame or saddle.

The arms or leaves B C of spring A, which are quite stiff, are, when applied to the frame, under tension sufficient to cause them to press firmly against the pin F and bail E respectively, and to tend constantly to separate or spread apart at their free ends. When the weight is thrown forwardly onto the nose or horn of the saddle, the arm B will be bent or depressed but slightly, and the arm C will also bend down or tend to straighten out, carrying the lower end of the bail E forward slightly, and the upper end rearwardly and downwardly, and allowing the saddle to tip down at the front upon the pin F as a pivot; but when this has taken place there will be no further appreciable yielding or spring action because the weight being directly over the ends of the arms no leverage can be exerted through the saddle-frame to bend either leaf. Any tendency of the parts C E to separate is counteracted by the upward and rearward pressure exerted by leaf B on the pin F. When, however, the rider sits erect and his weight is thrown upon the rear end of the saddle, the upper leaf B will be but slightly depressed as before, and the saddle will rock upon the pin F as a pivot, and, acting upon the leaf C through the medium of the bail, will bend the said leaf C upwardly, thus permitting an exceedingly easy rocking movement free from sudden throws.

In order to vary the tension of the spring, and to prevent the accidental disengagement of the spring from the saddle, I employ a strap H, which connects the saddle or the seat frame with the rear end of the spring. The hooked or curved end $b$ of the leaf B may, however, be so formed as to preclude this accidental displacement, in which case the strap may be omitted.

In Fig. 3 I have shown a modified arrangement in which the plate D is dispensed with, and the link or stirrup and the pin F are attached directly to the saddle-frame. After the spring is hooked at its ends to the pin F and the link or stirrup E, respectively, and pressed down to the proper position, I insert in the frame in front of the link or stirrup a pin $d$, which prevents the rear end of the saddle from rising and carrying the pin F out of engagement with the upper leaf of the spring.

A suitable clip or eye I will be employed to attach the spring to the ordinary bicycle-seat support.

Having thus described my invention, what I claim is—

1. The combination with a seat or saddle; of a spring having two leaves located one above the other and independently pivotally connected with the seat at its forward end.

2. The combination with a seat or saddle, of a spring having two leaves located one above the other and independently pivotally connected with the seat at its forward end; and means connecting the rear end of the saddle and spring for varying the tension of the latter.

3. In combination with a seat; a spring composed of two leaves located one above and over the other,—and a pin and link respectively connecting said leaves to the forward part of the seat.

4. In combination with a plate D provided with pin F and link E; the spring A provided with leaves B and C,—the leaf B being connected with pin F, and the leaf C being connected with the link.

5. In combination with a seat; a spring composed of two leaves located one above and over the other,—the lower leaf and the shorter upper leaf being connected with the front end of the seat by a swinging link and a pin, respectively.

6. In combination with a seat or saddle; a spring having two leaves located one above the other and independently connected with the seat at its forward end.

7. In combination with a seat; a spring composed of two leaves located one above and over the other,—the lower leaf and the shorter upper leaf being connected with the front end of the seat by a swinging link and a pin, respectively; and a clip connecting the lower leaf between its ends, to a support.

In witness whereof I hereunto set my hand in the presence of two witnesses.

HORACE PARK.

Witnesses:
WM. M. JUSTICE,
FRANK C. MAXWELL.